Oct. 30, 1962     E. J. SCHAEFER     3,060,860
END BELL FOR MOTOR-PUMP UNIT
Filed Oct. 10, 1960
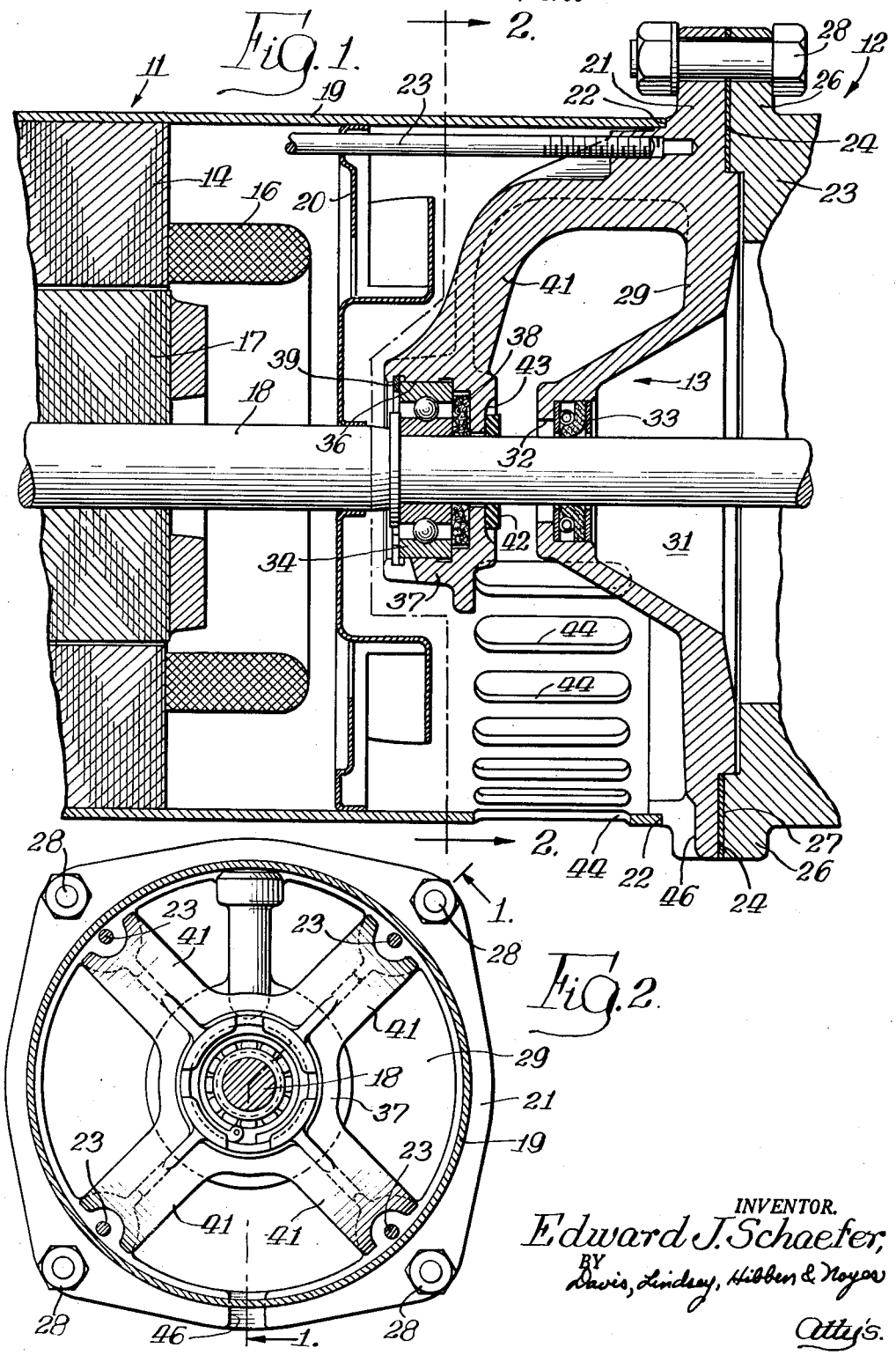
INVENTOR.
Edward J. Schaefer,
BY Davis, Lindsey, Hibben & Noyes
Atty's.

United States Patent Office 3,060,860
Patented Oct. 30, 1962

3,060,860
END BELL FOR MOTOR-PUMP UNIT
Edward J. Schaefer, % Franklin Electric Co., Inc.,
400 E. Spring St., Bluffton, Ind.
Filed Oct. 10, 1960, Ser. No. 61,790
6 Claims. (Cl. 103—87)

This invention relates to combined motor-pump units and more particularly to an improved unit having an end bell adapted to be interposed between adjacent ends of a motor and a pump driven by the motor.

It has become common practice in certain types of motor pump units to provide a single member or end bell that separates the motor from the pump and functions both as a support for a common motor-pump shaft and as an end member for a casing that houses the pump impeller. Such end bell is provided with a shaft bearing in which the motor-pump shaft is journaled and, to prevent liquid from entering the motor along the shaft, the member is provided with a shaft seal. Heretofore such bearing and seal were mounted in a single hub, carried by the wall of the end bell with the seal located nearer the pump to prevent liquid from damaging the bearings. A slinger has also been mounted on the motor shaft in a confined drain cavity provided in the hub between the bearing and the seal to take care of any seepage that might occur between the shaft and the seal. The economic and other advantages of this arrangement are self evident.

Use of the above structure has not only verified the advantages, but has also disclosed one major disadvantage. The bearing mounted in the end bell member frequently failed prematurely. I have discovered two major causes for such bearing failure. One such cause is condensation of moisture in the bearing due to the bearing hub being cooled by the liquid being pumped below the dew point of the atmosphere in which the bearing operates. I have further found that the slinger, located in the confined cavity in the hub, sometimes acts as a small pump, if leakage by the seal becomes excessive, thus forcing the liquid into the bearing.

It is a primary object of the present invention to provide a combined motor pump unit having an improved form of end bell for separating the pump from the motor.

Another object is to provide an improved form of end bell structure for motor pump units and that is arranged to cooperate with the motor and pump in a manner to protect a bearing mounted therein against above mentioned two sources of damage.

Other objects and advantages of the invention will be apparent from the following description taken in conjunction with the accompanying drawing, wherein:

FIG. 1 is a sectional view (taken along line 1—1 in FIG. 2) of a portion of a motor-pump unit embodying the features of the present invention; and FIG. 2 is a sectional view on a smaller scale, taken along line 2—2 in FIG. 1.

The objects of this invention are accomplished by providing an end bell that has a wall separating the pump from the motor and which is arranged to minimize the cooling effect, on a shaft bearing mounted therein, by the liquid being pumped. This is conveniently accomplished by spacing the bearing and its support axially from the wall of the end bell and by providing a relatively long heat-conducting path from the bearing to the wall. The long path and heat from the motor thus reduce cooling of the bearing. The end bell is also arranged to accommodate a slinger, mounted on the motor-pump shaft, intermediate the bearing and the wall, and the slinger is mounted in the open, so to speak, within the motor frame, rather than in a confined cavity as heretofore. Thus, the slinger cannot "pump" liquid to the bearing. Consequently, two sources of damage to the bearing are eliminated by the structure that embodies the features of the present invention.

FIG. 1 of the drawing illustrates a portion of a combined motor-pump unit incorporating a preferred form of end bell that embodies the features of the present invention. Both the motor and the pump used in the combined motor-pump unit are conventional. Therefore, only the adjacent end portions of the motor, indicated generally at 11, and of the pump, indicated generally at 12, are shown. Intermediate the adjacent ends of the motor 11 and the pump 12 is mounted the preferred form of end bell, indicated generally at 13.

The motor 11 is a conventional form of electric motor having a stator 14, provided with field windings 16, and having a rotor 17. A drive shaft 18 is rigidly connected to the rotor 17 in the usual manner for rotation in unison therewith. In the present unit, the shaft 18 extends into the pump 12 and has the pump impeller (not shown) mounted thereon. The motor 11 has a motor frame which comprises a cylindrical elongated sleeve or casing 19, located around the outside of the stator 14, that cooperates with the end bell 13 and another end bell (not shown but located at the opposite end of the motor) to enclose the motor. Between the end bell 13 and the stator-rotor assembly is a sheet metal baffle 20.

For cooperation with the sleeve or casing 19, the end bell 13 is provided with a flange portion 21 that extends circumferentially around the end bell 13. Facing the end edge of the sleeve or casing 19, is a shoulder 22 formed on the flange portion 21 and the adjacent edge of the sleeve or casing 19 is seated against the shoulder 22. The motor 11 is held in assembled relation with its casing or sleeve 19 abutting the shoulder 22 by four elongated studs 23 that extend through the motor and are threaded into the flange portion 21 of the end bell 13 as shown.

The end bell 13 also serves as a part of the casing for the pump 13 by cooperating with a pump casing member 23 to define a chamber in which the pump impeller (not shown) operates. For connection to the pump casing member 23, the flange portion 21 of the end bell 13 is provided with a circumferential seat 24 facing a corresponding flange 26 on the pump casing member 23. A gasket 27 is interposed between the seat 24 and the flange 26, and the flange portion 21 is clamped to the flange 26 by four circumferentially spaced bolts 28.

As mentioned above, the end bell 13 separates the interior of the motor from the impeller cavity of the pump. To this end, the end bell 13 is provided with a wall portion 29 that extends inwardly from the flange portion 21 toward the motor-pump shaft 18. Intermediate the flange portion 21 and the shaft 18, the wall 29 slopes toward the motor, as shown, to provide a recess 31 that forms part of the pump cavity. Also, the wall 29 is provided with a central aperture 32 through which the shaft 18 passes. Mounted in the aperture 32 is a conventional shaft seal 33 for preventing liquid in the recess 31 from passing into the motor. It should be noted that, except for the aperture 32, the wall 29 is imperforate. It can be seen that the one side of the wall 29, facing the pump, is exposed to the cooling effect of the liquid being pumped, and the opposite side of the wall 29 facing the motor, is exposed to heat from the motor.

The end bell 13 also includes a bearing for supporting the shaft 18. In the present instance a ball bearing 34 is mounted in an aperture 36 formed in a hub 37. Also mounted in the aperture 36 on the pump side of the bearing 34 is an oil impregnated felt washer 38. The bearing 34 is held in place in the hub 37 by a snap ring 39.

To prevent the bearing 34 and the hub 37 from being cooled below the dew point of the atmosphere in which the bearing operates, the hub 37 is located in axial spaced relation to the side wall 29 facing the motor. The hub 37 is supported at this position, in this instance, by four circumferentially spaced elongated arms 41. Each of the arms 41 has one of its ends joined to the hub 37 and the other of its ends joined to a portion of the end bell 13, in this instance the flange portion 21. The arms 41 are shaped as shown to provide a relatively long heat path between the hub 37 and the wall 29 and to provide a relatively small cross sectional area. Heat conduction from the bearing 34 to wall 29 is thus minimized. Moreover since the arms 41 are exposed to and will absorb heat from the motor, the amount of heat that the arms 41 will conduct from the bearings 37 to the wall 29 is further reduced. Thus it can be seen that it is unlikely that the bearing 34 will ever be cooled below the dew point.

Although the seal 33 will normally prevent water from entering the motor around the shaft 18, some seepage between the seal 33 and the shaft 18 may occur. To prevent such seepage from reaching the bearing 34, the shaft 18 is provided with a neoprene slinger 42 located in the space between the hub 37 and the wall 29. Of course, the slinger 42 rotates in unison with the shaft and, in the present instance, is located in a depression 43 formed in the hub 37. Any seepage water thrown out by the slinger 42 is free to pass through the relatively large spaces between the arms 41. Hence, there is no confining cavity in which the slinger 42 can act as a pump to force liquid into the bearing.

To permit air to enter the motor for ventilation purposes and to permit liquid thrown out by the slinger 42 to drain from the motor when the motor is mounted in the horizontal position shown in FIG. 1, the sleeve or casing 19 is provided with a plurality of circumferentially spaced openings 44. The openings 44 are located approximately in alignment with the plane of rotation of the slinger 42. When the motor pump unit is mounted in the vertical position, with the pump located below the motor, drainage of liquid thrown out by the slinger 42 from the motor cavity takes place through an opening 46 formed in the flange portion 21 of the end bell.

From the foregoing it is apparent that the present invention provides a motor pump-unit having a novel form of end bell which cooperates with both the motor and the pump. This new form of end bell is arranged to eliminate two additional sources of premature bearing failure.

Although the invention has been described in connection with a certain specific structural embodiment, it is to be understood that various modifications and alternative structures can be resorted to without departing from the invention as defined in the appended claims.

I claim:

1. In a combined air-cooled motor and liquid pump having a common drive shaft and a motor casing and a pump casing, an end bell mounted between said casings, said end bell having a flange portion connected to said motor casing and connected in sealed relation to said pump casing and having an end wall portion extending inwardly from said flange portion and exposed on its opposite faces to the pumped liquid and heated air from the motor, said end wall having an aperture for said drive shaft and provided with a seal around said shaft, a hub having a bearing supporting said shaft, and means for supporting said hub axially spaced from said end wall portion between said end wall portion and said motor and extending from one of said portions to said hub, said supporting means being elongated and having a relatively small cross-sectional area to impede heat transfer from the hub to the end wall and having openings passing air through said supporting means, whereby the temperature of the bearing is maintained above the dew point.

2. An end bell according to claim 1, in which said supporting means comprises at least one arm connected at one end to said flange portion and at its other end to said hub, said arm being elongated and of relatively small cross section area.

3. An end bell according to claim 1, in which said supporting means comprises a plurality of circumferentially spaced elongated arms of relatively small cross sectional area.

4. An end bell according to claim 3, in which said arms are each connected at one end to said flange portion and at the other end to said hub, said arms extending generally axially from said flange portion and curving inwardly to extend generally radially at said hub, thereby providing a relatively long heat path from said hub to said flange.

5. In a combined air-cooled motor and liquid pump having a common drive shaft and a motor casing and a pump casing, an end bell mounted between said casings, said end bell having a flange portion connected to said motor casing and connected in sealed relation to said pump casing and having an end wall extending inwardly from said flange portion and exposed on its opposite faces respectively to the pumped liquid and heated air from the motor, the said end wall having an aperture for said drive shaft and provided with a seal around said shaft, a hub having a bearing supporting said shaft, and a plurality of circumferentially spaced arms for supporting said hub in axially spaced relation from said end wall between said end wall and said motor, each of said arms being elongated and having one end connected to said flange portion and its other end to said hub, said arms providing the sole support for said hub, thereby impeding heat conduction from said hub to said wall portion.

6. An end bell for closely coupling an air cooled motor to a pump for liquid, the motor and pump having a common shaft and each having a casing, said end bell comprising a flange portion adapted to be engaged on opposite sides thereof by the motor and pump casings respectively, an end wall extending inwardly from said flange portion and having one face exposed for contact with pumped liquid and the opposite face exposed to the interior of the motor and adapted to seal the motor from pumped liquid, a hub containing a shaft bearing for said common shaft, and means for supporting said hub adjacent said wall and in axially spaced relation thereto within said motor casing, said supporting means connecting said hub to said flange portion, said motor casing having radial openings adjacent said flange portion for ventilating the motor and said supporting means having openings communicating with said casing openings, thereby permitting the air that cools the motor to circulate around said supporting means and said bearing to prevent cooling of said bearing below the dew point.

References Cited in the file of this patent

UNITED STATES PATENTS

| | | |
|---|---|---|
| 2,248,405 | Freeman | July 8, 1941 |
| 2,506,827 | Goodner | May 9, 1950 |
| 2,722,892 | French | Nov. 8, 1955 |
| 2,758,226 | Fisher | Aug. 7, 1956 |
| 2,939,400 | Maynard | June 7, 1960 |